United States Patent
Yang et al.

(10) Patent No.: US 9,712,779 B2
(45) Date of Patent: Jul. 18, 2017

(54) IMAGE DISPLAY METHOD AND APPARATUS

(75) Inventors: Hui Chul Yang, Seoul (KR); In Won Jong, Seoul (KR); Jin Young Jeon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1077 days.

(21) Appl. No.: 12/702,464

(22) Filed: Feb. 9, 2010

(65) Prior Publication Data

US 2010/0201709 A1   Aug. 12, 2010

(30) Foreign Application Priority Data

Feb. 6, 2009  (KR) .................. 10-2009-0009759

(51) Int. Cl.
| | |
|---|---|
| G09G 5/02 | (2006.01) |
| H04N 5/58 | (2006.01) |
| H04N 21/422 | (2011.01) |
| H04N 21/431 | (2011.01) |
| H04N 21/44 | (2011.01) |
| G09G 5/00 | (2006.01) |

(52) U.S. Cl.
CPC ......... H04N 5/58 (2013.01); H04N 21/42202 (2013.01); H04N 21/4318 (2013.01); H04N 21/44008 (2013.01); *G09G 5/00* (2013.01); *G09G 2360/144* (2013.01)

(58) Field of Classification Search
None
See application file for complete search history.

(56) References Cited

U.S. PATENT DOCUMENTS

| | | | | |
|---|---|---|---|---|
| 5,129,011 | A * | 7/1992 | Nishikawa et al. | 382/173 |
| 6,587,225 | B1 * | 7/2003 | Sakatani et al. | 358/1.9 |
| 2002/0126396 | A1 * | 9/2002 | Dolgoff | 359/743 |
| 2007/0101286 | A1 * | 5/2007 | Minami et al. | 715/779 |
| 2007/0176916 | A1 * | 8/2007 | Choe et al. | 345/207 |
| 2008/0088572 | A1 * | 4/2008 | Wang et al. | 345/102 |
| 2008/0189656 | A1 * | 8/2008 | Abanami et al. | 715/810 |
| 2008/0215999 | A1 | 9/2008 | Kim et al. | |
| 2010/0067782 | A1 * | 3/2010 | Dunn | G06T 7/0081 382/162 |

FOREIGN PATENT DOCUMENTS

JP    2004-258390    9/2004

OTHER PUBLICATIONS

Silvia Zuffi, Carla Brambilla, Giordano Beretta, & Paolo Scala. Human Computer Interaction: Legibility and Contrast. 14th International Conference on Image Analysis and Processing, pp. 1-6, IEEE 2007.

* cited by examiner

*Primary Examiner* — Kyle Zhai
(74) *Attorney, Agent, or Firm* — Cha & Reiter, LLC.

(57) ABSTRACT

An image display method and apparatus are disclosed. When a background image and a foreground image are displayed in an overlapping manner, the comprehensibility of the foreground image is enhanced by adjusting the brightness of the background image on the basis of the external illumination, of the brightness difference between the background image and the foreground image, or of the image complexity of the background or foreground images.

16 Claims, 20 Drawing Sheets

RETENTION OR REDUCTION OF BRIGHTNESS OF
BACKGROUND IMAGE (REDUCTION BY 0 - 10%)

REDUCTION OF BRIGHTNESS OF
BACKGROUND IMAGE BY 30 - 50%

REDUCTION OF BRIGHTNESS OF
BACKGROUND IMAGE BY 60 - 90%

FIG . 5a
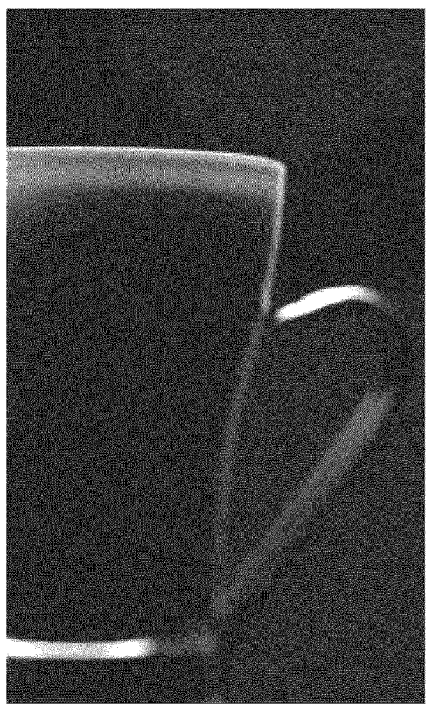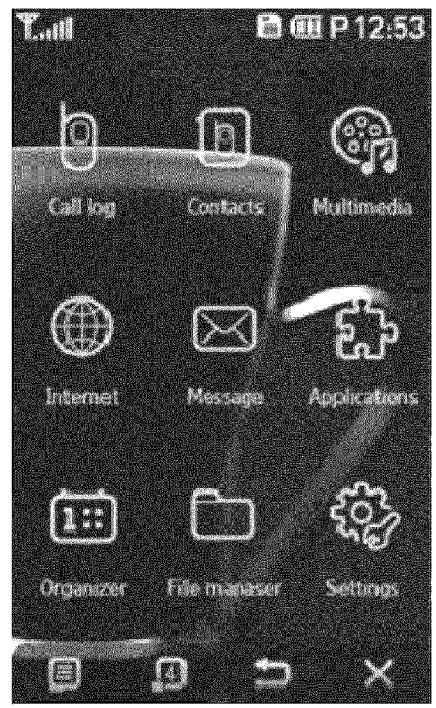
RETENTION OF BRIGHTNESS OF BACKGROUND IMAGE
(REDUCTION BY 0 - 10%)

FIG. 5b
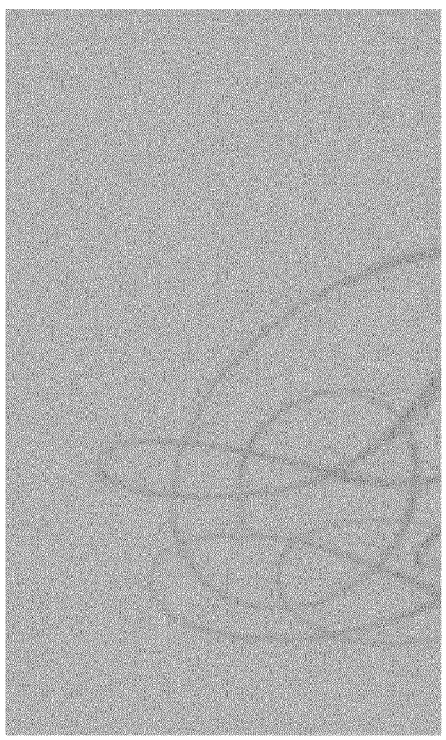
REDUCTION OF BRIGHTNESS OF
BACKGROUND IMAGE BY 30 - 50%

FIG . 5c
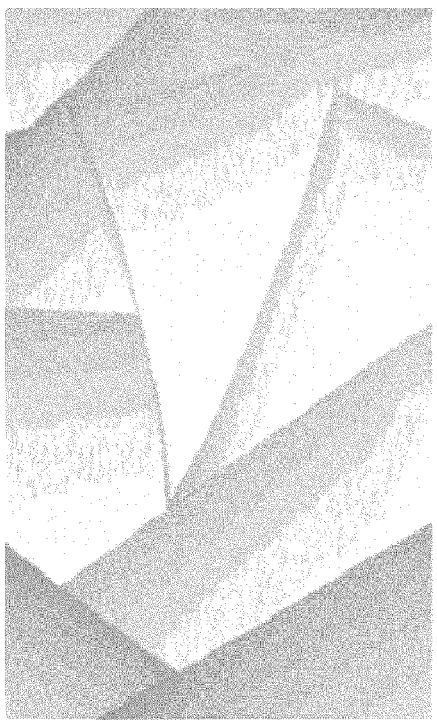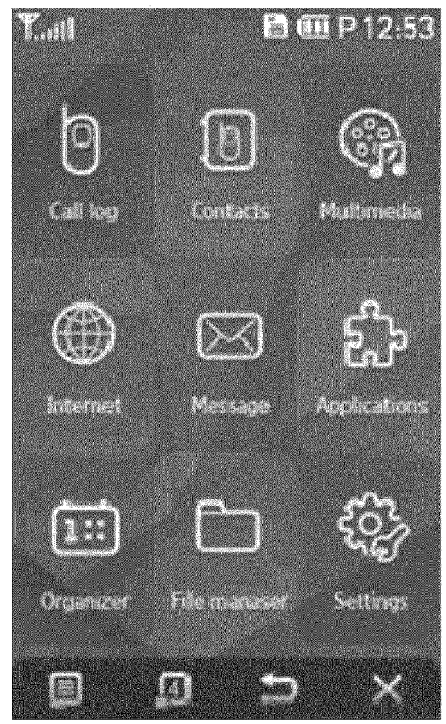
**REDUCTION OF BRIGHTNESS OF
BACKGROUND IMAGE BY 60 - 90%**

RETENTION OF BRIGHTNESS OF
BACKGROUND IMAGE (REDUCTION BY 0 - 10%)

REDUCTION OF BRIGHTNESS OF
BACKGROUND IMAGE BY 30 - 50%

REDUCTION OF BRIGHTNESS OF
BACKGROUND IMAGE BY 60 - 90%

IMAGE DISPLAY METHOD AND APPARATUS

CROSS REFERENCE TO RELATED APPLICATIONS

This application claims priority from and the benefit of Korean Patent Application No. 10-2009-0009759, filed on Feb. 6, 2009, which is hereby incorporated by reference for all purposes as if fully set forth herein.

BACKGROUND OF THE INVENTION

Field of the Invention

Exemplary embodiments of the present invention relate generally to an image display method and apparatus and, more particularly, to an image display method and apparatus that enhance visual comprehensibility of a foreground image by adjusting the brightness of the background image when the foreground image overlaps with the background image.

Discussion of the Background

Advances in display technology have enabled popularization of various display devices. For example, display devices are employed by a variety of user terminals such as a mobile communication terminal, a navigation system, a personal digital assistant (PDA), and a portable multimedia player (PMP). Such terminals provide a graphical user interface (GUI), which is normally designed in the product development process.

In particular, the GUI of a modern mobile terminal is designed to be editable for customization and personalization. For example, the user of a mobile terminal may change the background image set in the idle screen if desired. The mobile terminal may display, for example, a calendar as a foreground image that overlaps with a background image. If the mobile terminal is equipped with a touch screen, the terminal may display a content image as a foreground image and may play back a corresponding content when the content image is touched. In such a case, comprehensibility or readability of the content image may be important. When a content image has poor comprehensibility, the user may have difficulty in identifying the content indicated by the content image. Hence, it is necessary to develop strategies to enhance visual comprehensibility when images (e.g., a foreground image and a background image) are displayed in an overlapping manner.

SUMMARY OF THE INVENTION

Exemplary embodiments of the present invention provide an image display method and apparatus that can enhance visual comprehensibility of the foreground image by adjusting the brightness of the background image.

Additional features of the invention will be set forth in the description which follows, and in part will be apparent from the description, or may be learned by practice of the invention.

Exemplary embodiments of the present invention disclose an image display method that comprises displaying a background image and a foreground image in an overlapping manner, determining whether to adjust a brightness of the background image, and displaying a brightness-adjusted background image in response to a determination to adjust the brightness of the background image.

Exemplary embodiments of the present invention also disclose an image display apparatus that comprises a storage unit to store a background image and a foreground image, a user interface processor to cause the background image and the foreground image to be displayed in an overlapping manner, a control unit to determine whether to adjust the brightness of the background image if the background image and the foreground image are to be displayed in an overlapping manner, an image processor to create a brightness-adjusted background image, the image processor under the control of the control unit, and a display unit to display the brightness-adjusted background image and the foreground image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 5A, FIG. 5B, FIG. 5C, FIG. 5D, and FIG. 5E show screen representations for the procedure of FIG. 4.

DETAILED DESCRIPTION OF ILLUSTRATED EMBODIMENTS

Figure 1:
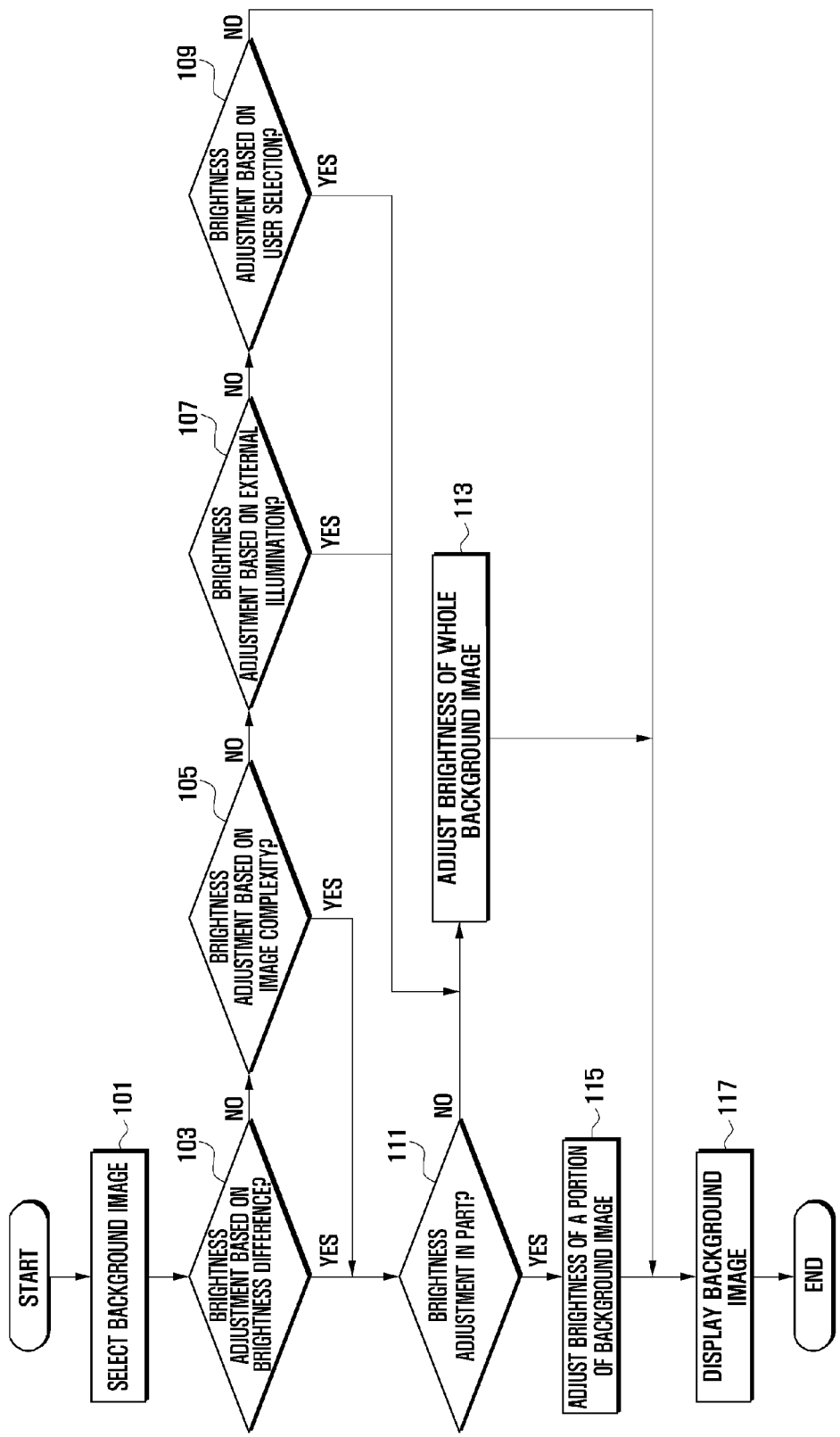
FIG. 1 is a flow chart showing an image display method according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, exemplary embodiments of the present invention are described in detail with reference to the accompanying drawings.

FIG. 1 is a flow chart showing an image display method according to an exemplary embodiment of the present invention. Referring to FIG. 1, the mobile terminal selects a background image (101). The background image may overlap with a foreground image. The foreground image may be, for example, a content image related to a specific content, a calendar, or a menu screen.

The mobile terminal may determine the brightness adjustment criteria to be used. The mobile terminal checks whether brightness adjustment for the background image is related to the difference between the brightness of the background image and that of the foreground image (103). When brightness adjustment is related to the brightness difference, the mobile terminal checks whether partial brightness adjustment is set (111). When partial brightness adjustment is set, the mobile terminal adjusts the brightness of a selected portion of the background image (115). Thereafter, the mobile terminal displays the background image that is brightness-adjusted in part (117). When partial brightness adjustment is not set, the mobile terminal adjusts the brightness of the whole background image (113) and displays the background image that is brightness-adjusted in whole (117).

When brightness adjustment is not related to the brightness difference, the mobile terminal checks whether brightness adjustment is related to the complexity level of the foreground image (105). When brightness adjustment is related to the complexity level of the foreground image, the mobile terminal proceeds to step 111. Step 111 and subsequent steps are the same as in the case of use of the brightness difference.

When brightness adjustment is not related to the complexity level of the foreground image, the mobile terminal checks whether brightness adjustment is related to the external illumination level (107). When brightness adjustment is related to the external illumination level, the mobile terminal adjusts the brightness of the whole background image (113), and displays the background image that is brightness-adjusted in whole (117).

When brightness adjustment is not related to the external illumination level, the mobile terminal checks whether brightness adjustment is related to user selection (109). When brightness adjustment is related to user selection, the mobile terminal adjusts the brightness of the whole background image (113) and displays the background image that is brightness-adjusted in whole (117). When brightness adjustment is not related to user selection, the mobile terminal displays the background image without brightness adjustment (117).

In the above description, the brightness adjustment scheme is checked in sequence. However, the present invention is not limited by the checking sequence of the brightness adjustment scheme so alternative checking sequences may be employed, and more than one brightness adjustment scheme may be used simultaneously.

In addition, the effect of brightness adjustment may be obtained by additional ways. For example, if the background image is displayed at a first layer and the foreground image is displayed at a second layer, then brightness adjustment of the background image may be achieved by inserting a third layer between the first layer and the second layer and adjusting the transparency level of the third layer. Setting the transparency level of the third layer to 100 percent may correspond to retaining the original brightness of the background image, and setting the transparency level of the third layer to less than 100 percent may correspond to reducing the brightness of the background image. The effect of brightness adjustment of the background image may be effected by adjusting the transparency level of the third layer.

An image display method is described above. Next, procedures for using the external illumination level, the brightness difference between the foreground image and background image, and the complexity level of the foreground image are described.

Figure 2:
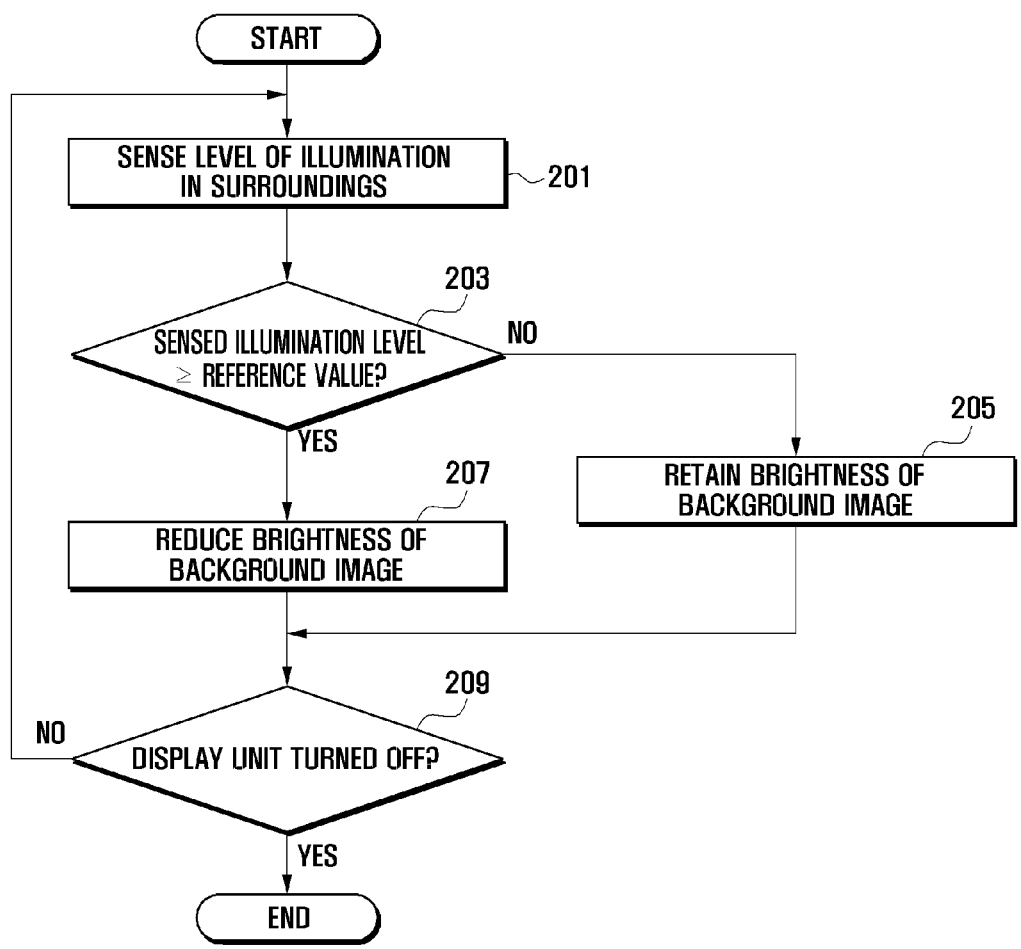
FIG. 2 is a flow chart showing a procedure to adjust the brightness of a background image corresponding to the level of external illumination according to an exemplary embodiment of the present invention.
Figure 3A:
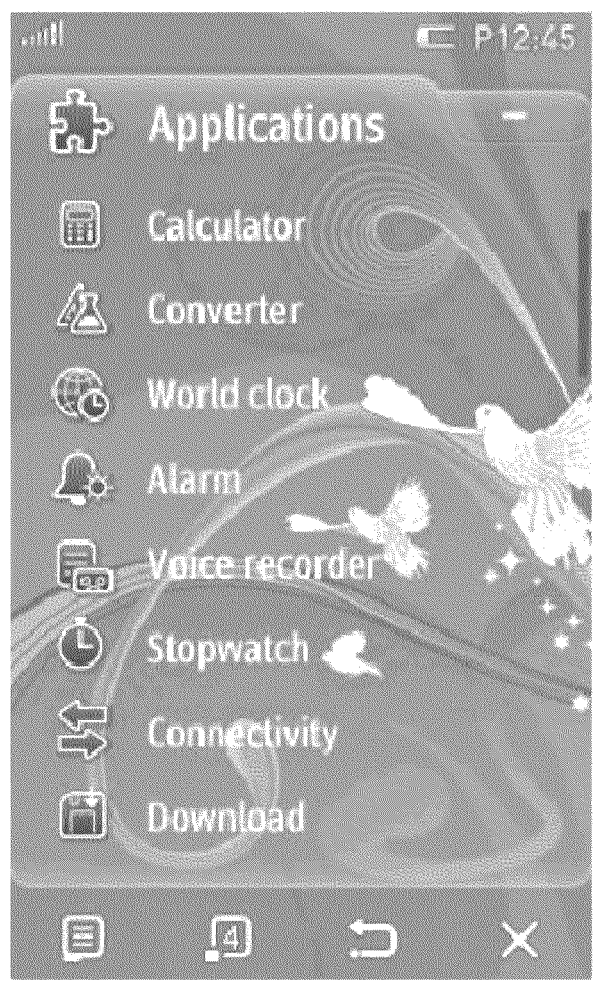
FIG. 3A, FIG. 3B, and FIG. 3C show screen representations for the procedure of FIG. 2.
Figure 3B:
Figure 3C:

FIG. 2 is a flow chart showing a procedure to adjust the brightness of the background image corresponding to the level of external illumination according to an exemplary embodiment of the present invention, and FIG. 3A, FIG. 3B, and FIG. 3C show screen representations for the procedure of FIG. 2.

Referring to FIG. 2, when the display unit is turned on, the mobile terminal senses the level of illumination in the surroundings (201), i.e., the external illumination level. The mobile terminal may include an ambient light sensor. Illumination sensing may be carried out periodically. The mobile terminal checks whether the sensed external illumination level is higher than or equal to a reference value (203). When the sensed external illumination level is higher than or equal to the reference value, the mobile terminal may reduce the brightness of the background image (207). The mobile terminal may include an image processor capable of adjusting image brightness. The image processor may adjust the brightness of a background image stored in the storage unit, and cause the display unit to display the brightness-adjusted background image. When the sensed external illumination level is lower than the reference value, the mobile terminal may retain the background image without brightness adjustment (205). Thereafter, the mobile terminal checks whether the display unit is turned off (209). When the display unit is turned off, the mobile terminal ends the procedure. When the display unit is still turned on, the mobile terminal returns to step 201 for illumination sensing.

In the above description, a single reference value is set for the brightness adjustment according to the level of external illumination. However, multiple reference values may also be set for brightness adjustment of the background image. For example, the level of external illumination may be divided into three levels. When the sensed external illumination level corresponds to the first level, the mobile terminal may retain the background image without brightness adjustment (brightness reduction by 0%). As shown in FIG. 3A, brightness of the background may be adjusted by a range of values (e.g., 0% to 10%), depending on additional device configuration related to the first external illumination level. When the sensed external illumination level corresponds to the second level, the mobile terminal may reduce the brightness of the background image by a different percentage value relative to the adjustment amount of the first level. As shown in FIG. 3B, the brightness of the background may be adjusted by a range of values (e.g., 30% to 50%), depending on additional device configuration related to the second external illumination level. When the sensed external illumination level corresponds to the third level, the mobile terminal may reduce the brightness of the background image by yet another percentage value. As shown in FIG. 3C, the brightness of the background may be adjusted by a range of values (e.g., 60% to 90%), depending on additional device configuration related to the third external illumination level. The amount of brightness adjustment, including the range of adjustment percentages, for each external illumination level may be determined during the design process or may be set by the user. The mobile terminal may provide the user with a brightness adjustment menu for the background image.

Figure 4:
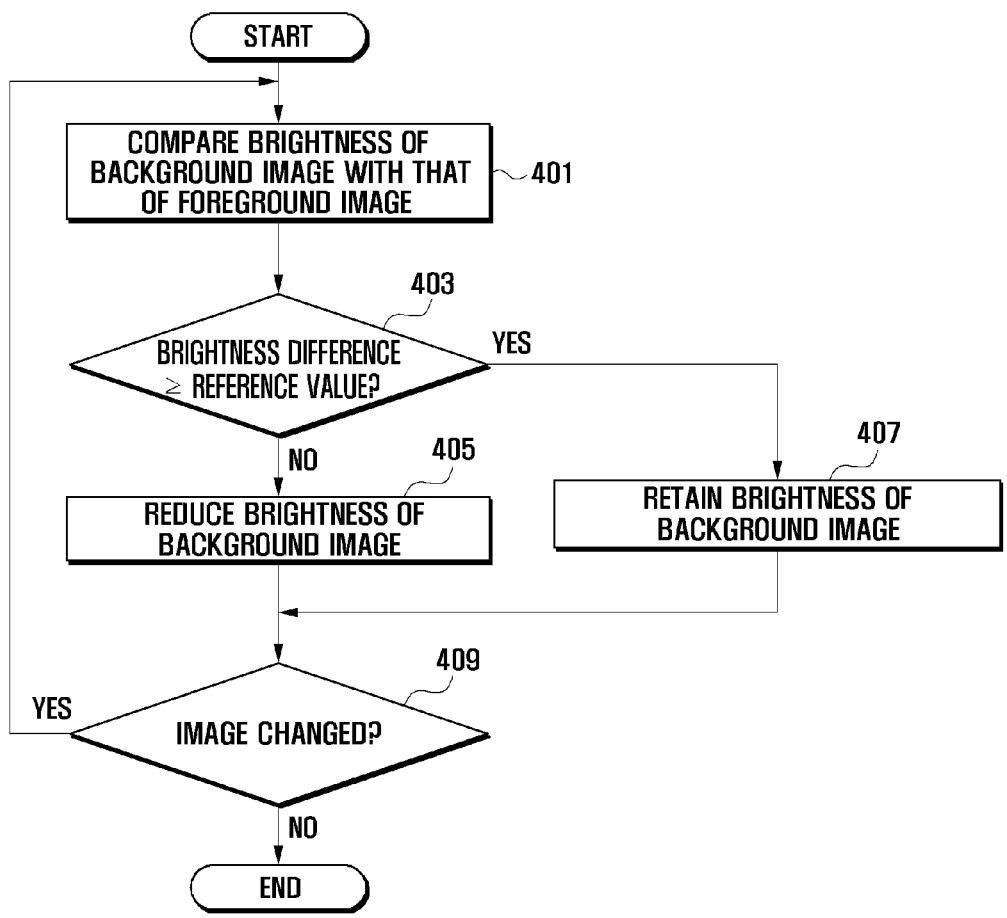
FIG. 4 is a flow chart showing a procedure to adjust the brightness of a background image according to the difference between the brightness of a foreground image and that of the background image according to an exemplary embodiment of the present invention.

FIG. 4 is a flow chart showing a procedure to adjust the brightness of the background image according to the difference between the brightness of the foreground image and the brightness of the background image according to an exemplary embodiment of the present invention, and FIG. 5A, FIG. 5B, FIG. 5C, FIG. 5D, and FIG. 5E show screen representations for the procedure of FIG. 4.

Referring to FIG. 4, the mobile terminal compares the brightness of the background image with that of the foreground image when at least the background image and the foreground image are changed (401). The mobile terminal may include a brightness calculator, which calculates the brightness levels of the background image and foreground image and compares the calculated brightness levels with each other. Here, the brightness level of an image may be the average of brightness values of all pixels in the image.

The mobile terminal checks the difference between the brightness of the background image and the brightness of the foreground image relative to a reference value (403). When the brightness difference is greater than or equal to the reference value, the mobile terminal may retain the background image without brightness adjustment (407). That is, when the difference between the brightness of the background image and that of the foreground image is greater than or equal to the reference value, the mobile terminal may regard the comprehensibility of the foreground image as acceptable.

When the brightness difference is less than the reference value, the mobile terminal may reduce the brightness of the background image (405). That is, the mobile terminal may enhance the comprehensibility of the foreground image by causing the difference between the brightness of the background image and that of the foreground image to be greater than or equal to the reference value. For example, when the brightness difference between the foreground image and the background image is 10 units and the reference value is 30 units, the mobile terminal may reduce the brightness of the background image by 20 units to make the brightness difference equal to the reference value.

Thereafter, the mobile terminal checks whether the background image or the foreground image changes (409). If the background image or the foreground image changes, the mobile terminal returns to step 401 to determine whether the changed image requires brightness adjustment. When neither the background image nor the foreground image is changed, the mobile terminal ends the procedure.

In the above description, a single reference value is set for the brightness adjustment according to the brightness difference between the foreground image and the background image. However, multiple reference values may also be set for brightness adjustment of the background image. For example, the brightness difference may be divided into three levels. When the calculated brightness difference corresponds to the first level, the mobile terminal may retain the background image without brightness adjustment (brightness reduction by zero percent) As shown in FIG. 5A, the brightness of the background may be reduced by a range of values (e.g., 0% to 10%), depending on additional device configuration related to the first brightness difference level. When the calculated brightness difference corresponds to the second level, the mobile terminal may reduce the brightness of the background image by a different percentage value. As shown in FIG. 5B, the brightness of the background may be reduced by a range of values (e.g., 30% to 50%), depending on additional device configuration related to the second brightness difference level. When the calculated brightness difference corresponds to the third level, the mobile terminal may reduce the brightness of the background image by yet another percentage value. As shown in FIG. 5C, the brightness of the background may be reduced by a range of values (e.g., 60% to 90%), depending on additional device configuration related to the third complexity level. The amount of brightness reduction for each level may be defined experimentally during the design process or input by the user.

Figure 5D:
Figure 5E:

In the above description, brightness adjustment is applied to the whole background image. However, brightness adjustment may also be applied to a selected zone of the background image. The mobile terminal may partition the background image and foreground image into multiple zones. The mobile terminal may compare the brightness of a first zone in the background image with that of a matched zone in the foreground image and adjust the brightness of the first zone of the background image when the brightness difference between the two zones is less than a reference value. For example, as shown in FIG. 5D, when a zone 60 of the foreground image is not sufficiently comprehensible, the mobile terminal may reduce the brightness of a corresponding zone of the background to enhance comprehensibility of the foreground image. The resulting adjusted image is shown in FIG. 5E.

In the above description, the brightness of the background image is adjusted according to the brightness difference. However, the brightness of the background image may also be adjusted according to a color difference between the background image and the foreground image. When the background image has a color similar to that of the foreground image, comprehensibility of the foreground image may be degraded relative to background and foreground image colors having a higher degree of contrast. Hence, the mobile terminal may compare the dominant color of the background image with the dominant color of the foreground image. When the dominant colors are similar, the mobile terminal may reduce the brightness of the background image to thereby enhance comprehensibility of the foreground image. As described above, brightness adjustment based on color difference may also be applied to a selected zone of the background image.

Figure 6:
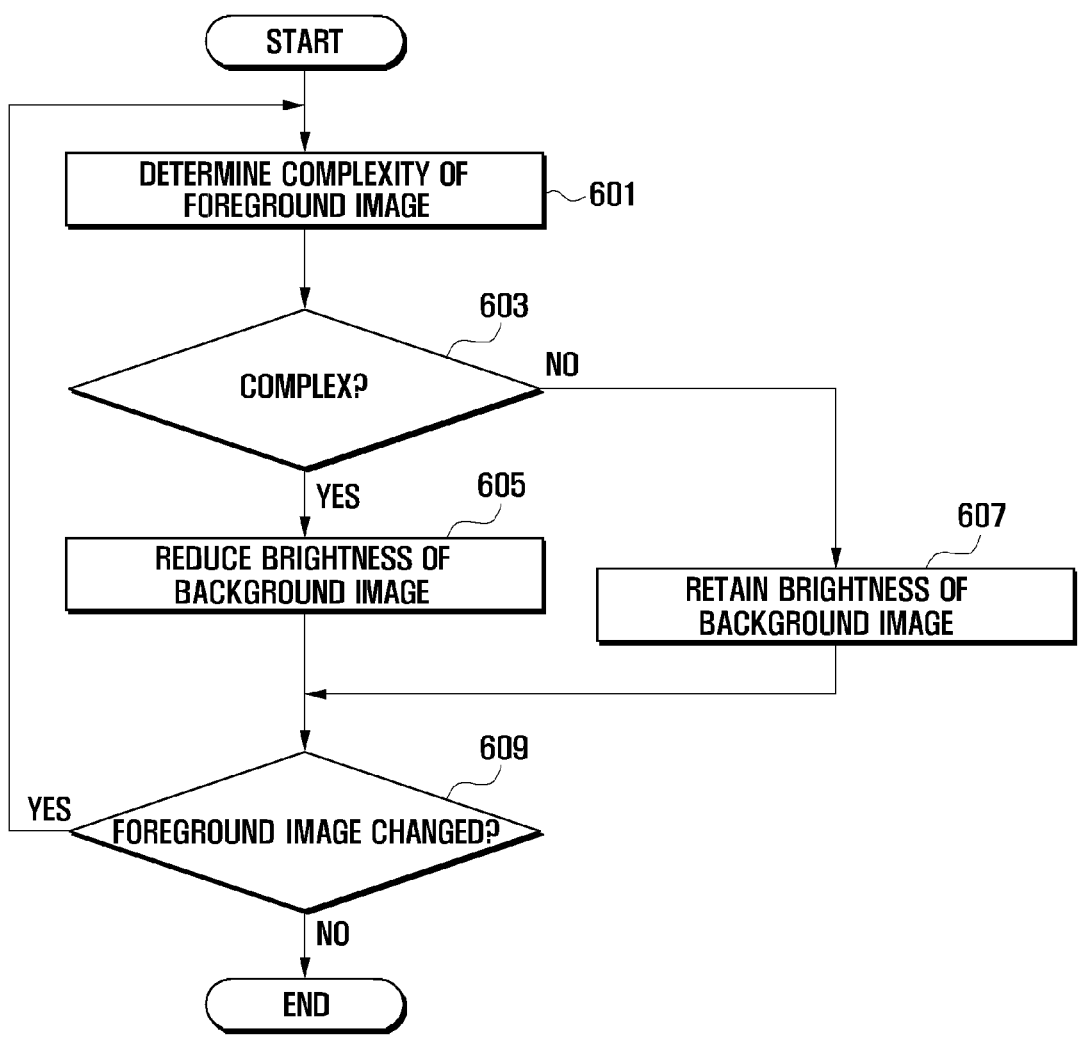
FIG. 6 is a flow chart showing a procedure to adjust the brightness of a background image according to the level of complexity of a foreground image according to an exemplary embodiment of the present invention.
Figure 7A:
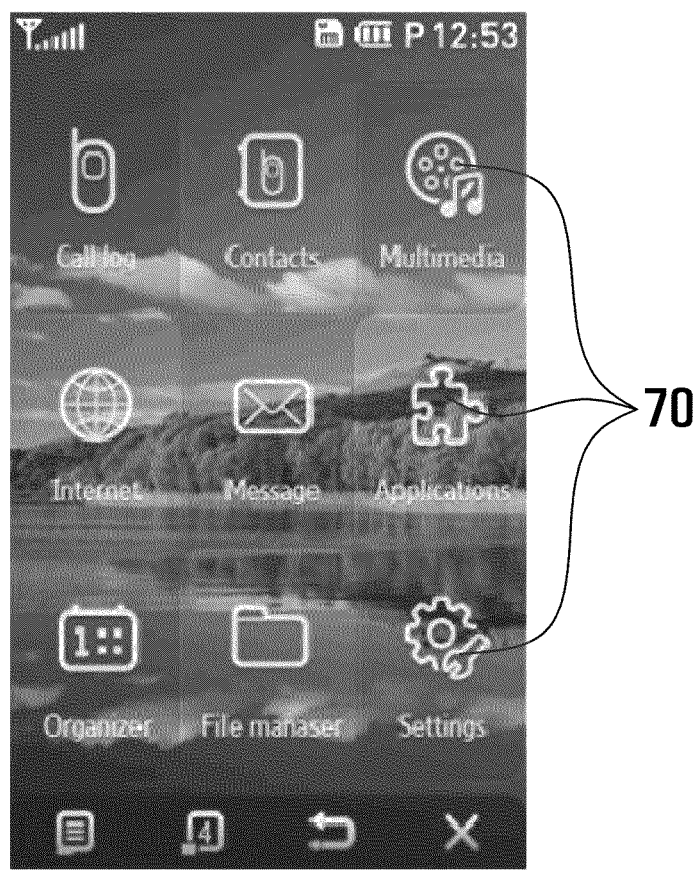
FIG. 7A, FIG. 7B, and FIG. 7C show screen representations for the procedure of FIG. 6.
Figure 7B:
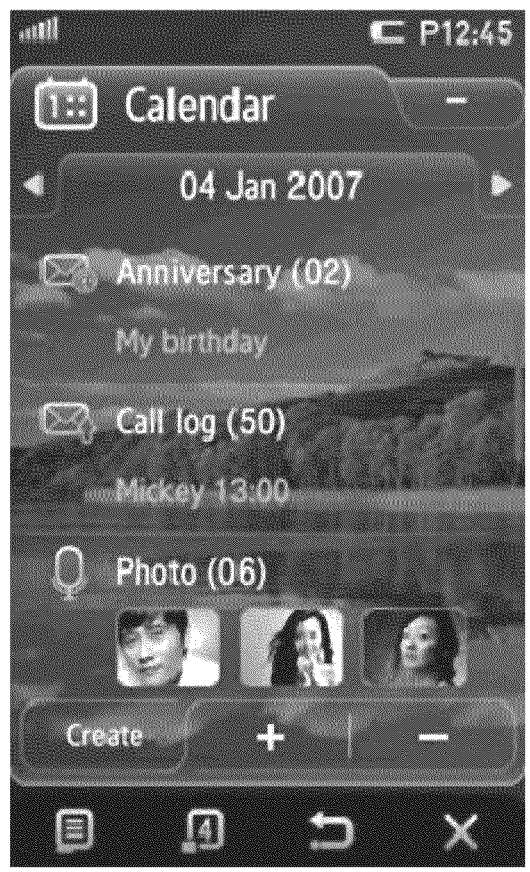
Figure 7C:

FIG. 6 is a flow chart showing a procedure to adjust the brightness of the background image according to the level of complexity of the foreground image according to an exemplary embodiment of the present invention, and FIG. 7A, FIG. 7B, and FIG. 7C show screen representations for the procedure of FIG. 6.

Referring to FIG. 6, the mobile terminal determines the complexity level of the foreground image when foreground image is changed (601). The mobile terminal may include a complexity calculator, which calculates the complexity level of the foreground image. The complexity level of a foreground image may be determined, for example, on the basis of the number of visual items contained in the foreground image. As shown in FIG. 7A, when the number of visual items such as content images 70 in the foreground image is less than or equal to a reference value (for example, nine), the mobile terminal may regard the foreground image as a low-complexity image. The complexity level of a foreground image may also be determined on the basis of the ratio of the area used for visual items to the area used for the background image displayed by the mobile terminal.

The mobile terminal checks whether the foreground image is a high-complexity image (603). When the foreground image is a low-complexity image, the mobile terminal may retain the background image without brightness adjustment (607). When the foreground image is a high-complexity image, the mobile terminal may reduce the brightness of the background image (605). Thereafter, the mobile terminal checks whether the foreground image is changed (609). When the foreground image is changed, the mobile terminal returns to step 601 for further brightness adjustment. When the foreground image is not changed, the mobile terminal ends the procedure.

In the above description, a single complexity level is set for the brightness adjustment according to the complexity of the foreground image. However, multiple reference values may also be set for brightness adjustment of the background image. For example, the complexity level may be divided into multiple levels. When the calculated complexity value corresponds to the first level, the mobile terminal may retain the background image without brightness adjustment (brightness reduction by 0%). As shown in FIG. 7A, the brightness of the background may be reduced by a range of values (e.g., 0% to 10%), depending on additional device configuration related to the first complexity level. When the calculated brightness difference corresponds to the second level, the mobile terminal may reduce the brightness of the background image by a different percentage value. As shown in FIG. 7B, the brightness of the background may be reduced by a range of values (e.g., 30% to 50%), depending on additional device configuration related to the second complexity level. When the calculated brightness difference corresponds to the third level, the mobile terminal may reduce the brightness of the background image by yet another percentage value. As shown in FIG. 7C, the brightness of the background may be reduced by a range of values (e.g., 60% to 90%), depending on additional device configuration related to the third complexity difference level. The amount of brightness reduction for each level may be defined experimentally during the design process or provided as user input.

In the above description, the brightness of the background image is adjusted on the basis of the complexity of the foreground image. However, the brightness of the background image may also be adjusted on the basis of the complexity of the background image.

Figure 8:
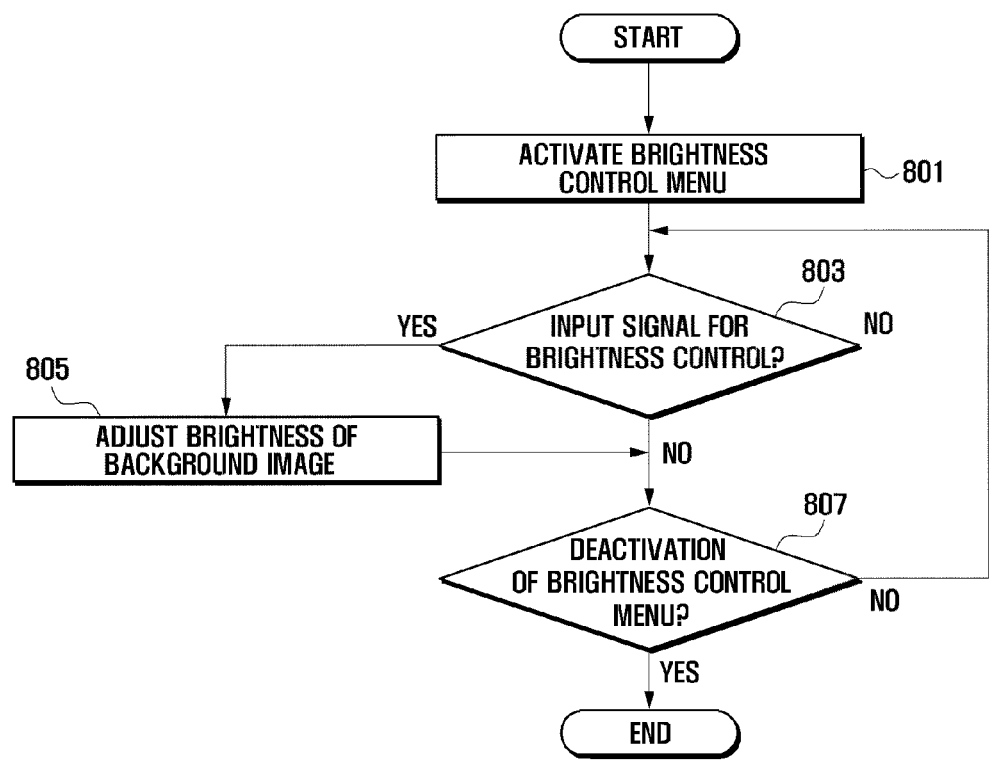
FIG. 8 is a flow chart showing a procedure to adjust the brightness of a background image through a brightness control menu according to an exemplary embodiment of the present invention.
Figure 9A:
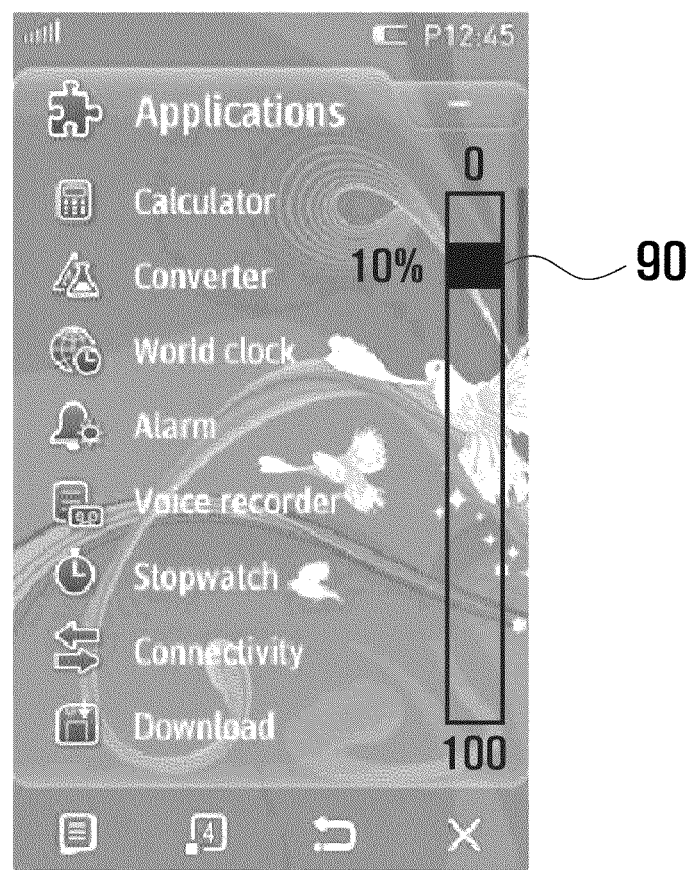
FIG. 9A, FIG. 9B, and FIG. 9C show screen representations for the procedure of FIG. 8.
Figure 9B:
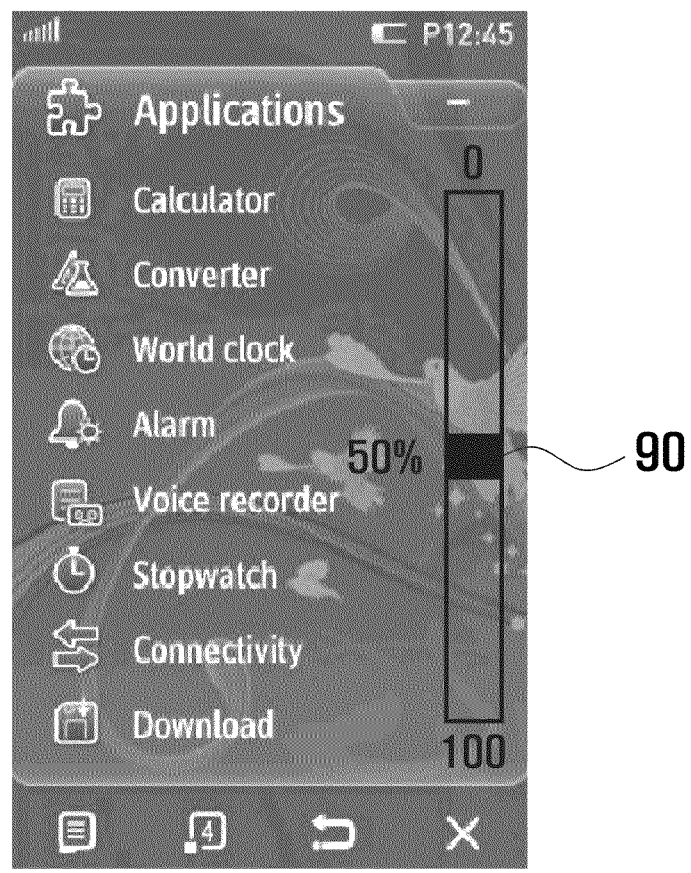
Figure 9C:

FIG. 8 is a flow chart showing a procedure to adjust the brightness of the background image through a brightness control bar according to an exemplary embodiment of the invention, and FIG. 9A, FIG. 9B, and FIG. 9C show screen representations for the procedure of FIG. 8.

Referring to FIG. 8, the mobile terminal activates a brightness control bar 90 for the background image in response to a user request (801). Thereafter, the mobile terminal checks whether an input signal for brightness control is received from the user (803). The user may generate an input signal for brightness control through a brightness control bar 90 as shown in FIG. 9A, FIG. 9B, and FIG. 9C or through a direction key (not shown). For example, the user may increase the brightness of the background image by moving the brightness control bar 90 upwards or by entering an 'up' key. The user may decrease the brightness of the background image by moving the brightness control bar 90 downwards or by entering a 'down' key.

When an input signal for brightness control is received, the mobile terminal adjusts the brightness of the background image according to the input signal (805), and proceeds to step 807. When an input signal for brightness control is not received after a set period of time elapses, the mobile terminal proceeds to step 807. At step 807, the mobile terminal checks whether a deactivation request for the brightness control bar 90 is issued. When a deactivation request for the brightness control bar 90 is not issued, the mobile terminal returns to step 803 for further brightness adjustment. When a deactivation request for the brightness control bar 90 is issued, the mobile terminal ends the procedure.

A description of the image display method appears above. Next, an image display apparatus is described.

Figure 10:
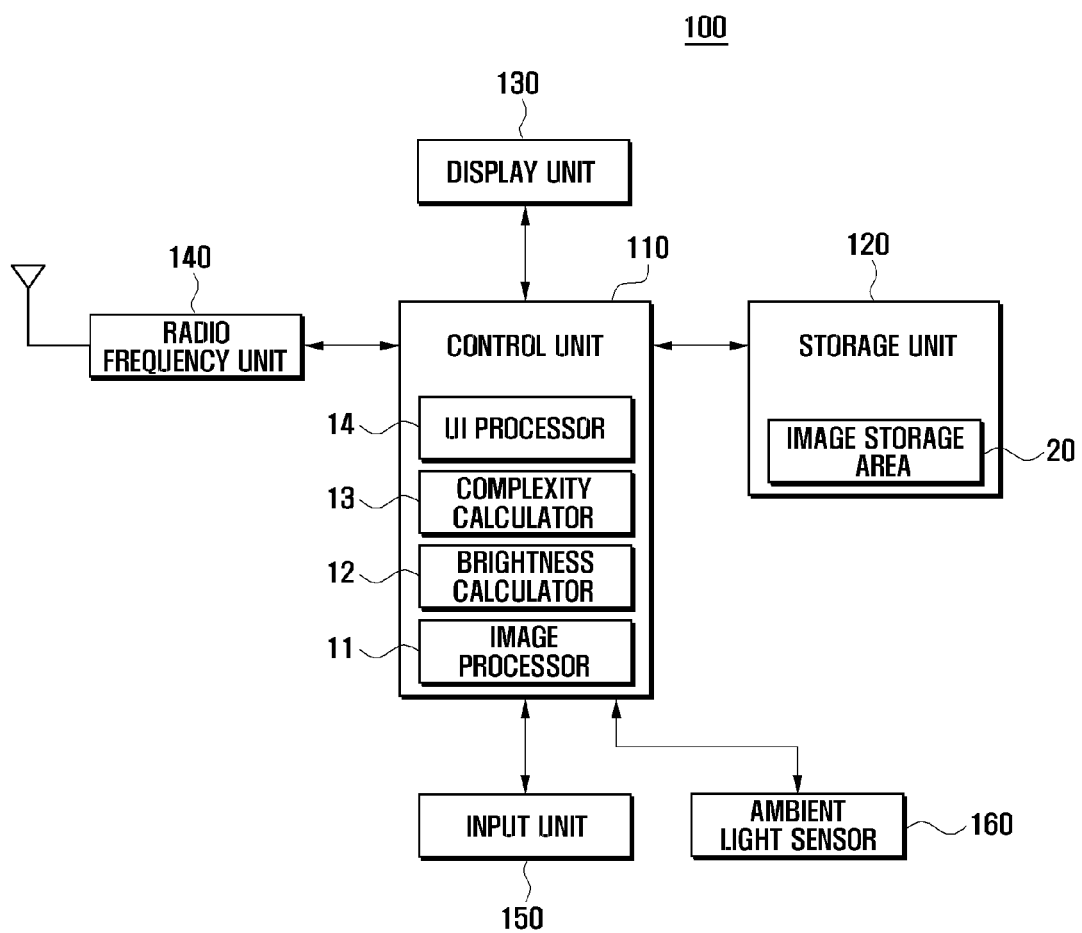
FIG. 10 is a block diagram showing a mobile terminal according to an exemplary embodiment of the present invention.

FIG. 10 is a block diagram showing a mobile terminal 100 according to an exemplary embodiment of the present invention.

Referring to FIG. 10, the mobile terminal 100 may include a control unit 110, a storage unit 120, a display unit 130, a radio frequency unit 140, an input unit 150, and an ambient light sensor 160. The control unit 110 may include an image processor 11, a brightness calculator 12, a complexity calculator 13, and a user interface (UI) processor 14. The storage unit 120 may include an image storage area 20.

The radio frequency unit 140 may establish a communication channel to a corresponding base station for data and voice communication and place or receive a voice or data call to or from another mobile terminal through the communication channel. To achieve this, the radio frequency unit 140 may include a radio frequency transmitter for upconverting the frequency of a signal to be transmitted and amplifying the signal and a radio frequency receiver for low-noise amplification of a received signal and for downconverting the frequency of the received signal. Under the control of the control unit 110, the radio frequency unit 140 may receive an image from a content providing server (not shown). The received image may be used as a background image or a foreground image.

The storage unit 120 may store an operating system for booting and controlling the mobile terminal 100 and application programs for playing back various multimedia contents. The storage unit 120 may store data generated by the use of the mobile terminal 100. In particular, the storage unit 120 may store a background image and a foreground image. The background image may be an image displayable as the background and may be a pre-stored image, a downloaded image, or a photograph captured by the mobile terminal 100. The foreground image may be a content image related to a specific content, a calendar, or a menu screen. The storage unit 120 may store application programs for adjusting the brightness of the background image, for calculating the brightness level of an image, and for calculating the complexity level of an image. The storage unit 120 may store information regarding the amount of brightness reduction for each level of illumination, for each level of brightness difference between the background image and the foreground image, and for each level of complexity of the foreground image.

In addition, the storage unit 120 may store versions of a background image that are brightness-adjusted in multiple preset levels. The brightness-adjusted versions of a background image may be stored in the image storage area 20. As a result of this feature, the control unit 110 may cause rapid output of a brightness-adjusted background image in response to a brightness adjustment request. This is further described later in connection with an image processor 11.

The display unit 130 may display various menus of the mobile terminal 100 and various information such as information input by the user, function setting information, and information to be provided to the user. The display unit 130 may be realized using liquid crystal display (LCD) devices or organic light emitting diodes (OLED). If the display unit 130 includes a touch screen, it may act as an input unit. In particular, the display unit 130 may display the background image and the foreground image together in an overlapping manner. The display unit 130 may display a brightness-adjusted version of the background image to enhance comprehensibility of the foreground image under the control of the control unit 110. The display unit 130 may display a brightness control bar 90 for adjusting the brightness of the background image at a location in response to activation of a brightness control menu.

The input unit 150 may include a plurality of alphanumeric and function keys to input alphanumeric information and to set various functions. The keys may include direction, side, and shortcut keys associated with corresponding functions. For example, when the brightness control bar 90 for adjusting the brightness of the background image is activated, the input unit 150 may send an input signal for brightness control to the image processor 11 (described later), and a brightness control bar 90 is displayed. In response to a user entering an input corresponding to the 'up' key after activation of the brightness control bar 90, the input unit 150 may generate an input signal to increase the brightness of the background image. In response to a user entering an input corresponding to the 'down' key after activation of the brightness control bar 90, the input unit 150 may generate an input signal to decrease the brightness of the background image. If the input unit 150 is equipped with a touch screen, the input unit 150 may generate an input signal to decrease or increase the brightness of the background image in response to a touch event (e.g., a drag event) occurring after activation of the brightness control bar 90.

The ambient light sensor 160 is a sensor to sense the level of external illumination. For sensing accuracy, the ambient light sensor 160 may be installed at a location of the display unit 130 that has a low probability of being obscured by the hand of the user. To reduce unnecessary power consumption, the ambient light sensor 160 may be activated when the display unit 130 is turned on and deactivated after a period of time has elapsed. The ambient light sensor 160 may sense the level of external illumination at intervals.

The control unit 110 controls the overall operation of the mobile terminal 100, including signal exchange between mobile terminal 100 components and data processing. The control unit 110 may cause the foreground image and the background image to be displayed in an overlapping manner and adjusts the brightness of the background image according to brightness adjustment criteria such as the level of external illumination, the brightness difference between the foreground image and the background image, the level of complexity of either the foreground image or the background image, and in response to output of a brightness control menu. In other words, the control unit 110 may increase the comprehensibility of the foreground image by adjusting the brightness of the background image. To achieve this, the control unit 110 may include a UI processor 14 and an image processor 11.

The UI processor 14 performs operations related to a user interface that may be stored in the storage unit 120 for ready deployment by the mobile terminal 100. The user interface may be a graphical user interface (GUI). The UI processor 14 may display the background image and the foreground image stored in the storage unit 120 in an overlapping manner on the display unit 130.

The image processor 11 may adjust the brightness of the background image to enhance the comprehensibility of the foreground image. The image processor 11 may read the background image from the storage unit 120, adjust the brightness of the background image under the control of the control unit 110, and display the brightness-adjusted background image on the display unit 130. The image processor 11 may achieve an effect similar to adjusting the brightness of the background image described above but in several different ways. For example, if the background image is displayed at a first layer and the foreground image is displayed at a second layer, then the brightness adjustment of the background may be effectively achieved by an adjustment of the transparency level of a third layer occurring between the first layer and the second layer. Setting the transparency level of the third layer to 100 percent may correspond to maintaining the original brightness of the background image, and setting the transparency level of the third layer to less than 100 percent may correspond to reducing the brightness of the background image. Hence, the image processor 11 may effect adjustment of the brightness of the background image by controlling the transparency level of the third layer.

Moreover, setting the transparency level of the third layer may be implemented in any of the background image brightness adjustment procedures described above. For example, if the adjustment is based on the difference between the brightness of the foreground and background images, the difference may be determined, and the transparency level of the third layer may be adjusted by a percentage value corresponding to the difference. Similar procedures may be established for setting the transparency level of the third layer based on image complexity, the level of external illumination, and a brightness menu.

The image processor 11 may generate versions of a background image that are brightness-adjusted in multiple preset levels (for example, three levels) and store the brightness-adjusted versions in the image storage area 20 of the storage unit 120. Due to this feature, the control unit 110 may cause rapid output of a stored brightness-adjusted background image in response to a brightness adjustment request.

Moreover, a stored brightness-adjusted version of a background image may be caused to be output by the control unit 110 in an implementation of any of the background brightness adjustment procedures described above. For example, if the brightness adjustment is based on the difference between the brightness of the foreground and background images, the difference may be determined, and a stored brightness-adjusted version corresponding to the difference may be caused to be output by the control unit. Similar procedures may be established for causing output of a stored brightness-adjusted version based on image complexity, the level of external illumination, and a brightness menu.

The control unit 110 may perform brightness adjustment on the basis of the level of external illumination sensed by the ambient light sensor 160. When the level of external illumination sensed by the ambient light sensor 160 is greater than or equal to a reference value, the control unit 110 may determine that the external illumination is strong and control the image processor 11 to reduce the brightness of the background image for comprehensibility enhancement of the foreground image.

The control unit 110 may adjust the brightness of the background image in whole or in part on the basis of the brightness difference between the background image and the foreground image. When the brightness of the background image is similar to the brightness of the foreground image so that the comprehensibility of the foreground image is degraded, the control unit 110 may control the image processor 11 to reduce the brightness of the background image for comprehensibility enhancement of the foreground image. To achieve this adjustment, the control unit 110 may include a brightness calculator 12.

The brightness calculator 12 may determine the brightness values of the background image and the foreground image and compare the brightness values. The brightness value of an image may be the average of brightness values of all pixels in the image. Alternatively, the brightness calculator 12 may partition the background image and the foreground image into multiple zones and compare the brightness of each zone of the background image with that of a corresponding zone in the foreground image. Comprehensibility reduction at a specific zone may be prevented. Alternatively, the brightness of the background image may also be adjusted according to the color difference between the background image and the foreground image. To achieve this, the control unit 110 may further include a color extractor (not shown).

The control unit 110 may adjust the brightness of the background image on the basis of at least one of the complexity levels of the background image and the foreground image. The complexity level of an image may be determined on the basis of the number of visual items such as letters contained in the image. That is, when at least one of the background image and the foreground image contains greater than a reference value of visual items, the control unit 110 may control the image processor 11 to reduce the brightness of the background image to increase comprehensibility of the foreground image. To achieve this, the control unit 110 may include a complexity calculator 13.

The complexity calculator 13 may calculate the complexity level of an image. For example, the complexity level of the foreground image may be determined on the basis of the number of visual items contained in the foreground image, and, when the number of visual items in the foreground image is less than or equal to a preset value, the complexity calculator 13 may regard the foreground image as a low-complexity image. Alternatively, the complexity level of the foreground image may be determined on the basis of the percentage of the area of the display unit 130 used for visual items in the foreground image.

In the above description, a single reference value is set for brightness adjustment according to brightness adjustment criteria including the level of external illumination, the brightness difference between the foreground image and the background image, and the level of complexity of the foreground image. However, multiple reference values may also be set for each brightness adjustment criterion. Brightness adjustment of the background image may be performed in multiple levels for each brightness adjustment criterion.

Although not shown, the mobile terminal 100 may further include additional items such as a camera module for capturing still and moving images, a broadcast reception module, an audio output device such as a speaker, an audio input device such as a microphone, and a digital audio module such as an MP3 module. For digital applications, the mobile terminal 100 may further include other units or modules.

Exemplary embodiments of the present invention are described above and include an image display method and an apparatus that provide a level of comprehensibility of a foreground image by adjusting the brightness of a background image to enhance user convenience and utility of the apparatus.

Although exemplary embodiments of the present invention described above relate to adjustment of the brightness of the background image, the procedures also apply to adjustment of the brightness of the foreground image. Adjustment of the brightness of the foreground image will result in a brightness-adjusted foreground image, which may result, as described above, from the adjustment of the brightness of the foreground image due to the difference between the brightness of the foreground and background images, image complexity, the level of external illumination, and a brightness menu. Additionally, the procedure of storing a brightness-adjusted background image by the image processor is also applicable to brightness-adjusted foreground images with rapid output by the control unit 110 in response to a brightness adjustment request.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An image display method, comprising:
   displaying a background image and a foreground image in an overlapping manner;
   determining whether to adjust a brightness of the background image;
   adjusting the brightness of the background image in response to a determination to adjust the brightness of the background image; and
   displaying the brightness-adjusted background image,
   wherein determining whether to adjust the brightness of the background image comprises:
   determining whether the brightness of the background image is to be adjusted based on a complexity of the foreground image, the complexity of the foreground image being determined based on a ratio of an area displaying a plurality of separated visual items in the foreground image to an area displaying the background image.

2. The image display method of claim 1, wherein determining whether to adjust the brightness of the background image further comprises at least one of:
   determining whether the brightness of the background image is to be adjusted based on an external illumination;
   determining whether the brightness of the background image is to be adjusted based on a difference between the brightness of the background image and a brightness of the foreground image;
   determining whether the brightness of the background image is to be adjusted based on a complexity of the background image; and determining whether the brightness of the background image is to be adjusted based on a brightness control input.

3. The image display method of claim 2, wherein displaying the brightness-adjusted background image comprises:
sensing a level of the external illumination if the brightness adjustment is based on the external illumination; and
adjusting the brightness of the background image by an amount corresponding to the level of the external illumination.

4. The image display method of claim 2, wherein displaying the brightness-adjusted background image comprises:
determining a first brightness value of the background image and a second brightness value of the foreground image if the brightness adjustment is based on the difference between the brightness of the background image and the brightness of the foreground image;
calculating a difference between the first brightness value and the second brightness value; and
adjusting the brightness of the background image by an amount corresponding to the difference if the second brightness value is less than the first brightness value.

5. The image display method of claim 2, wherein displaying the brightness-adjusted background image comprises:
partitioning the background image and the foreground image into multiple corresponding zones if the adjustment is based on the difference between the brightness of the background image and the brightness of the foreground image;
determining a brightness value for each zone of the background image and a brightness value for each zone of the foreground image,
calculating a difference between the brightness values of corresponding zones in the background image and the foreground image; and
adjusting the brightness of a first zone of the background image by an amount corresponding to the difference between the first zone of the background image and a corresponding first zone of the foreground image.

6. The image display method of claim 2, wherein displaying the brightness-adjusted background image comprises:
activating a brightness control bar if the adjustment is based on the brightness control input; and
adjusting the brightness of the background image in response to a signal generated by the brightness control bar.

7. The image display method of claim 1, wherein displaying the brightness-adjusted background image further comprises:
determining a complexity value of the background image; and
adjusting the brightness of the background image on the further basis of the complexity value of the background image.

8. An image display apparatus, comprising:
a storage unit to store a background image and a foreground image;
a user interface processor to cause the background image and the foreground image to be displayed in an overlapping manner;
a control unit to determine whether to adjust a brightness of the background image in response to the background image and the foreground image being displayed in the overlapping manner;
an image processor to create a brightness-adjusted background image, the image processor under control of the control unit; and
a display unit to display the brightness-adjusted background image and the foreground image,
wherein the control unit is configured to determine whether the brightness of the background image is to be adjusted based on a complexity of the foreground image, the complexity of the foreground image being determined based on a ratio of an area displaying a plurality of separated visual items in the foreground image to an area displaying the background image.

9. The image display apparatus of claim 8, wherein the control unit is configured to determine whether to adjust the brightness of the background image based on at least one of:
an external illumination;
a complexity of the background image;
a difference between the brightness of the background image and a brightness of the foreground image, and
an input signal received from a brightness control input.

10. The image display apparatus of claim 9, further comprising an ambient light sensor to sense a level of the external illumination.

11. The image display apparatus of claim 9, further comprising a brightness calculator to calculate a first average brightness value of the background image and a second average brightness value for the foreground image and to compare the first average brightness value and the second average brightness value, wherein the image processor is configured to adjust the brightness of the background image by an amount corresponding to a calculated difference between the first average brightness value and the second average brightness.

12. The image display apparatus of claim 9, further comprising a brightness calculator to partition the background image and the foreground image into multiple corresponding zones, to produce a brightness value for each zone of the background image and a brightness value for each zone of the foreground image, and to calculate a difference between the brightness values of a first zone in the background image and a corresponding first zone in the foreground image, wherein the image processor is configured to adjust a brightness of the first zone in the background image by an amount corresponding to the calculated difference.

13. The image display apparatus of claim 9, wherein the image processor is configured to reduce the brightness of the background image according to an input signal generated by a brightness control bar if the brightness adjustment is based on the brightness control input.

14. The image display apparatus of claim 8, further comprising a complexity calculator to produce a complexity value of the background image, wherein the image processor is configured to adjust the brightness of the background image on the further basis of the complexity value of the background image.

15. An image display apparatus, comprising;
a storage unit to store a background image and a foreground image; a user interface processor to cause the background image and the foreground image to be displayed in an overlapping manner;

a control unit to determine whether to adjust a brightness of the background image in response to the background image and the foreground image being displayed in the overlapping manner;

an image processor to create a brightness-adjusted background image, the image processor under control of the control unit; and a display unit to display the brightness-adjusted background image and the foreground image, wherein the control unit is configured to determine whether the brightness of the background image is to be adjusted based on a complexity of the foreground image, the complexity of the foreground image being determined based on a number of visual items in the foreground image and a ratio of an area displaying the visual items in the foreground image to an area displaying the background image.

16. The image display apparatus of claim 15, further comprising a complexity calculator to produce a complexity value of the background image, wherein the image processor is configured to adjust the brightness of the background image on the further basis of the complexity value of the background image.

\* \* \* \* \*